United States Patent
Yoshino

(10) Patent No.: US 9,310,928 B2
(45) Date of Patent: Apr. 12, 2016

(54) COORDINATE POSITION DETECTING DEVICE AND DISPLAY INPUT DEVICE

(71) Applicant: Sharp Kabushiki Kaisha, Osaka-shi, Osaka (JP)

(72) Inventor: Hiroki Yoshino, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/246,385

(22) Filed: Apr. 7, 2014

(65) Prior Publication Data

US 2014/0300564 A1 Oct. 9, 2014

(30) Foreign Application Priority Data

Apr. 8, 2013 (JP) .................................. 2013-080482

(51) Int. Cl.
*G06F 3/041* (2006.01)
*G06F 1/32* (2006.01)

(52) U.S. Cl.
CPC .............. *G06F 3/0416* (2013.01); *G06F 1/324* (2013.01); *G06F 1/3262* (2013.01)

(58) Field of Classification Search
CPC ..... G06F 3/041; G06F 3/0412; G06F 3/0416; G06F 3/0418; G06F 3/044; G06F 1/324; G06F 1/3262

USPC .......................................................... 345/173
See application file for complete search history.

(56) References Cited

U.S. PATENT DOCUMENTS

| | | | |
|---|---|---|---|
| 2006/0201931 A1* | 9/2006 | Lee et al. ........................ | 219/497 |
| 2013/0314360 A1 | 11/2013 | Saitoh et al. | |
| 2015/0009166 A1 | 1/2015 | Saitoh et al. | |

FOREIGN PATENT DOCUMENTS

| | | |
|---|---|---|
| JP | 2000-214999 A | 8/2000 |
| JP | 2007/65767 A | 3/2007 |
| JP | 2006-11568 A | 1/2008 |
| WO | WO 2012/141112 A1 | 10/2012 |

* cited by examiner

*Primary Examiner* — Gustavo Polo
(74) *Attorney, Agent, or Firm* — Birch, Stewart, Kolasch & Birch, LLP

(57) ABSTRACT

A touch screen includes a capacitive sensor, a sensor driving portion, and a control portion. The capacitive sensor detects a touch position coordinate in a scanning plane for each frame of the scanning plane. The sensor driving portion drives the capacitive sensor at a speed of a frame rate, the frame rate representing a number of frames detected by the capacitive sensor per unit time. The central portion acquires an amount of movement of the touch position between successive frames based on positional information detected by the capacitive sensor, and sets the frame rate depending on the amount of movement.

8 Claims, 6 Drawing Sheets

FIG.4

|  | FRAME RATE |
|---|---|
| FIRST SET VALUE | 50Hz |
| SECOND SET VALUE | 200Hz |
| THIRD SET VALUE | 400Hz |

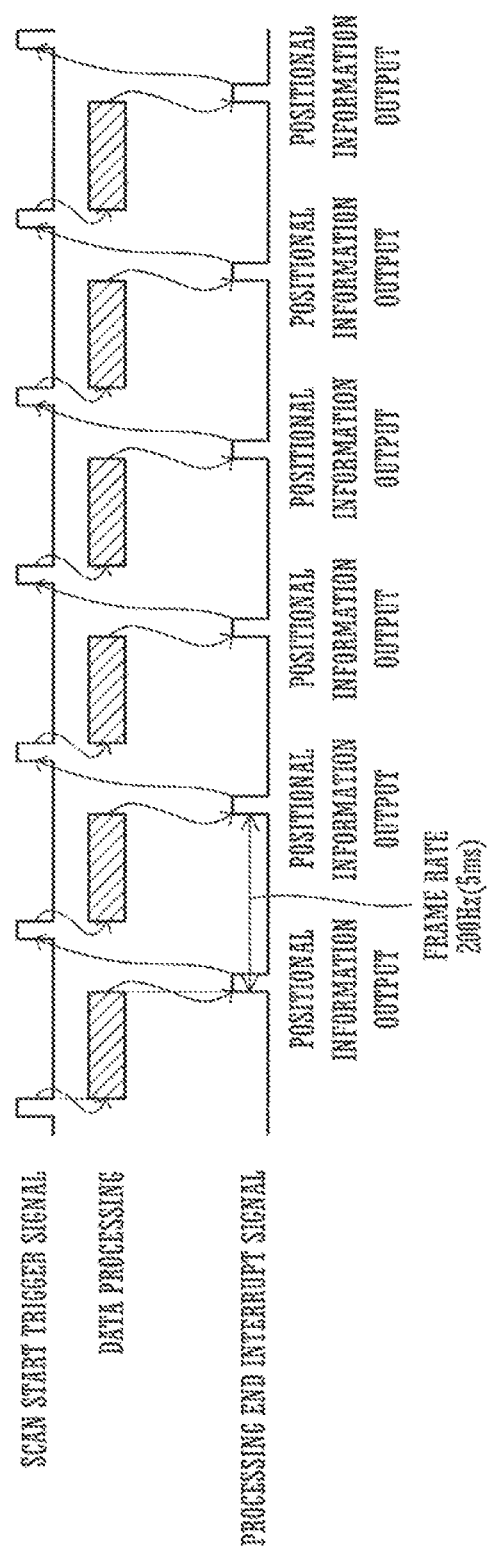

COORDINATE POSITION DETECTING DEVICE AND DISPLAY INPUT DEVICE

CROSS REFERENCE

This Nonprovisional application claims priority under 35 U.S.C. §119(a) on patent application No. 2013-080482 filed in Japan on Apr. 8, 2013, the entire contents of which are hereby incorporated by reference.

BACKGROUND OF THE INVENTION

This invention relates to a coordinate position detecting device that detects a touch position coordinate in a scanning plane for each frame of the scanning plane and a display input device including the same.

Some of the coordinate position detecting devices such as a touch screen set a frame rate representing the number of detections per unit time of a touch position coordinate in a scanning plane, and detect the touch position coordinate for each frame at a speed of the frame rate.

A known example of each a coordinate position detecting device is an optical touch screen that is configured to increase the scanning speed when a user moves the touch position quickly (for example, see Japanese published unexamined application No. 2006-11568). This optical touch screen skips some of the intervals of the detection pitches of a light emitting device and a light receiving element to increase the scanning speed.

An optical touch screen is also known in which if the user moves the touch position at a low speed, a detection beam emitted from one light emitting device is sequentially detected by up to five light receiving elements, and at a higher moving speed, a detection beam emitted from one light emitting device is detected by less light receiving elements (for example, Japanese published unexamined application No. 2007-65767).

However, No. 2006-11568 describes a conventional coordinate position detecting device that is intended to reduce the time necessary to scan one frame, but does not consider the scanning time interval between frames. In addition, if the touch position moves at a high speed, some of the intervals of the detection pitches are skipped to increase the scanning speed, thus reducing the scanning accuracy.

No. 2007-65767 also describes a conventional coordinate position detecting device that is intended to reduce the time necessary to scan one frame, but does not consider the scanning time interval between frames. In addition, when the touch position moves at a higher speed, a detection beam emitted from one light emitting device is detected by less light receiving elements, thus reducing the scanning accuracy.

It is therefore an object of the present invention to provide a coordinate position detecting device that reduces the processing load of the position detection for power saving and improved scanning accuracy, and a display input device including the same.

SUMMARY OF THE INVENTION

A coordinate position detection device according to this invention includes a position detecting portion, a driving portion, and a control portion. The position detecting portion detects a touch position coordinate in a scanning plane for each frame of the scanning plane. The driving portion drives the position detecting portion at a speed of a frame rate, the frame rate representing the number of frames detected by the position detecting portion per unit time. The control portion acquires an amount of movement of the touch position between successive frames based on the positional information detected by the position detecting portion, and sets the frame rate depending on the amount of movement.

In this configuration, the amount of movement of the touch position between successive frames is acquired for each frame on the basis of the positional information of the touch position for each frame. For a small amount of movement between frames, the frame rate may be set to a lower speed without largely increasing the position interval of the detected positional information between successive frames, thus allowing for a fine scanning. In addition, the frame rate may be set to a low speed to reduce the processing load of the position detection. Meanwhile, for a large amount of movement between frames, the frame rate may be set to a higher speed to provide a smaller position interval of the detected positional information between successive frames, thus allowing for improved scanning accuracy.

A display input device according to this invention, includes a display device and the above coordinate position detecting device. The display device displays information on a display screen. The coordinate position detecting device is overlapped on the display screen and configured to be able to receive an input operation corresponding to the information displayed on the display screen.

In this configuration, for a small amount of movement of the touch position between frames, the frame rate may be set to a lower speed without largely increasing the position interval of the detected positional information between successive frames, thus allowing for a fine scan. In addition, the frame rate may be set to a low speed to reduce the processing load of the position detection. Meanwhile, for a large amount of movement of the touch position between frames, the frame rate may be set to a higher speed to provide a smaller position interval of the detected positional information between successive frames, thus allowing for improved scanning accuracy.

The present invention may reduce the processing load of the position detection for power saving and improved scanning accuracy.

BRIEF DESCRIPTION OF THE DRAWINGS

FIG. 4 shows an example of a plurality of predetermined frame rate candidates;

FIG. 6 is a timing chart schematically showing processing of a coordinate position detecting device according to another embodiment.

DETAILED DESCRIPTION OF THE INVENTION

Figure 1:
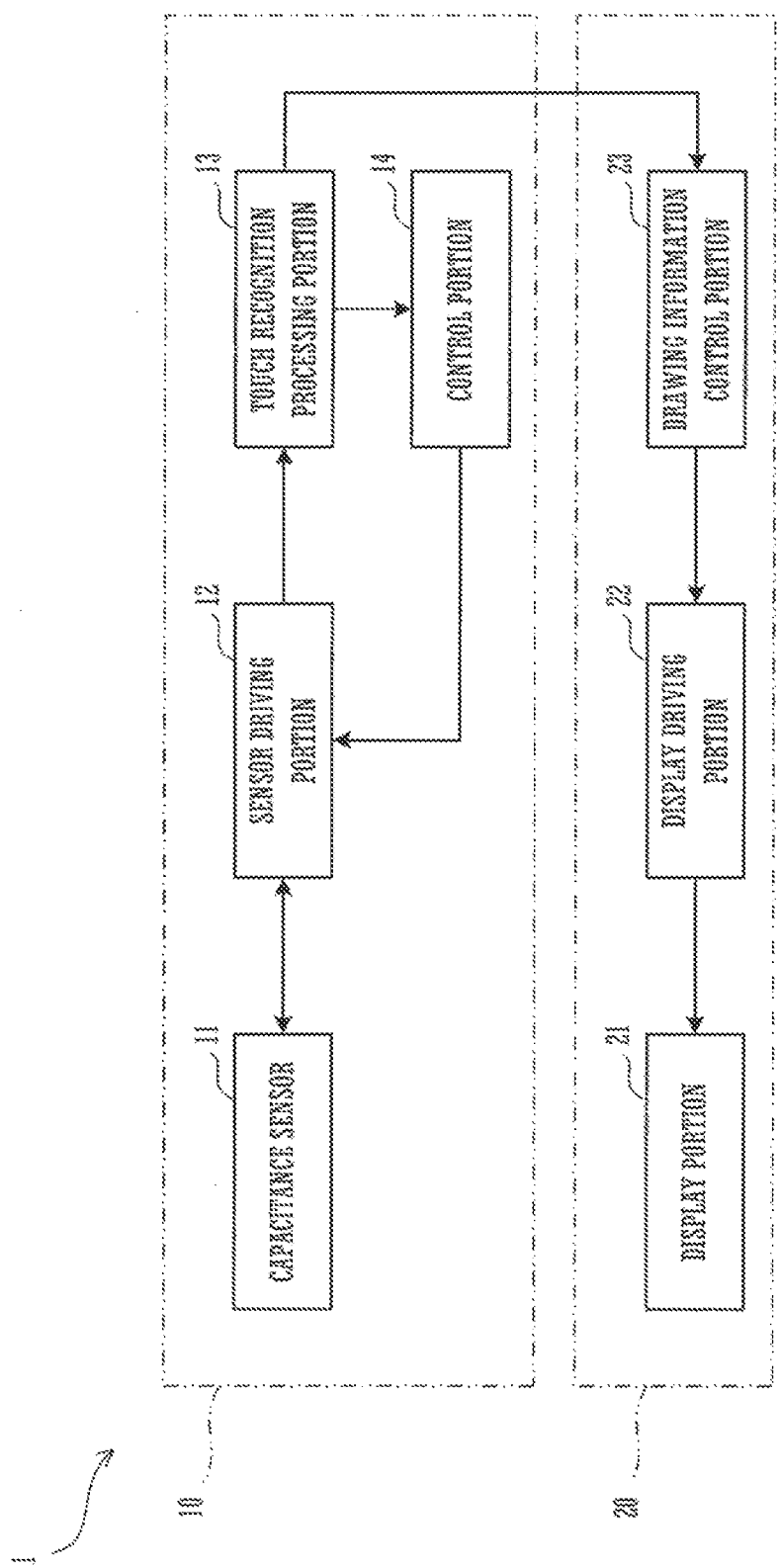
FIG. 1 is a block diagram showing a schematic configuration of a display input device including a coordinate position detecting device according to an embodiment of this invention.

With reference to FIG. 1, a display input device 1 that includes an projected capacitive touch screen 10 according to an embodiment of this invention includes, in addition to the touch screen 10, a display device 20. The touch screen 10 is an example of the coordinate position detecting device. The touch screen 10 is overlapped on a display portion 21 of the display device 20 and configured to be able to receive an input operation corresponding to the information displayed on the display portion 21.

The touch screen 10 includes a capacitive sensor 11, a sensor driving portion 12, a touch recognition processing portion 13, and a control portion 14. The touch screen 10 is configured to be able to detect a touch position coordinate in a scanning plane for each frame (one screen) of the scanning plane.

The capacitive sensor 11 is a position detecting portion. The capacitive sensor 11 includes a plurality of electrode lines disposed in a matrix in a scanning plane and detects capacitance at each coordinate position in the scanning plane. By way of example, the capacitive sensor 11 detects, with the coordinate (0, 0) of the upper left corner and the coordinate (4095, 2159) of the lower right corner, the capacitance at each of the coordinate positions of 4096×2160. The detected capacitance is output via the sensor driving portion 12 to the touch recognition processing portion 13.

If an electrostatically conductive object approaches the scanning plane, the capacitance changes at the position at which the object approaches the scanning plane and has a different value from that in other positions. Examples of the electrostatically conductive object include a dedicated pen and a person's fingertip.

The touch recognition processing portion 13 recognizes the position that shows different capacitance from other positions in the scanning plane as a touch position at which the object approaches the scanning plane. With the position detection of the touch position is one screen of the scanning plane as one frame processing, the touch position is detected for each frame. The touch recognition processing portion 13 performs a menu processing when the touch position is the position corresponding to a menu selection screen. The touch recognition processing portion 13 performs a drawing processing when the touch position is the position corresponding to other positions than the menu selection screen. The drawing processing performs drawing to join the coordinates of the touch positions detected for each frame. For example, the drawing processing performs drawing to join the coordinates of the touch positions for each frame with a straight line.

The sensor driving portion 12 drives the capacitive sensor 11. The sensor driving portion 12 detects the capacitance at each coordinate position on the basis of detection data output from the capacitive sensor 11. The sensor driving portion 12 drives the capacitive sensor 11 at a speed of the frame rate representing the number of frames detected by the capacitive sensor 11 per unit time.

The control portion 14 acquires an amount of movement of the touch position between successive frames for each frame on the basis of the positional information of the touch position for each frame. The control portion 14 outputs instruction data to the sensor driving portion 12 to set the frame rate to a lower speed for a small amount of movement between frames and set the frame rate to a higher speed for a large amount of movement between frames. This will be described in more detail below.

The display device 20 includes the display portion 21, a display driving portion 22, and a drawing information control portion 23.

The drawing information control portion 23 includes a not-shown storage portion for storing the information displayed on the display portion 21. The storage portion holds drawing information such as handwritten information and graph information, and menu information temporarily overlapped and displayed on the drawing information, as different layers. The drawing information control portion 23 updates, depending on the menu processing and the drawing processing performed by the touch recognition processing portion 13, the stored information in the storage portion.

The display driving portion 22 drives, depending on the information stored in the storage portion in the drawing information control portion 23, the display portion 21 and displays the information on the display portion 21.

The display portion 21 is configured to provide information to the user by displaying the information on the display screen. For example, the display portion 21 includes a liquid crystal display device and an EL display device and the like. The display portion 21 has a plane shape. The capacitive sensor 11 is overlapped on the display portion 21.

The procedure of changing the frame rate FR will now be described.

Figure 2:
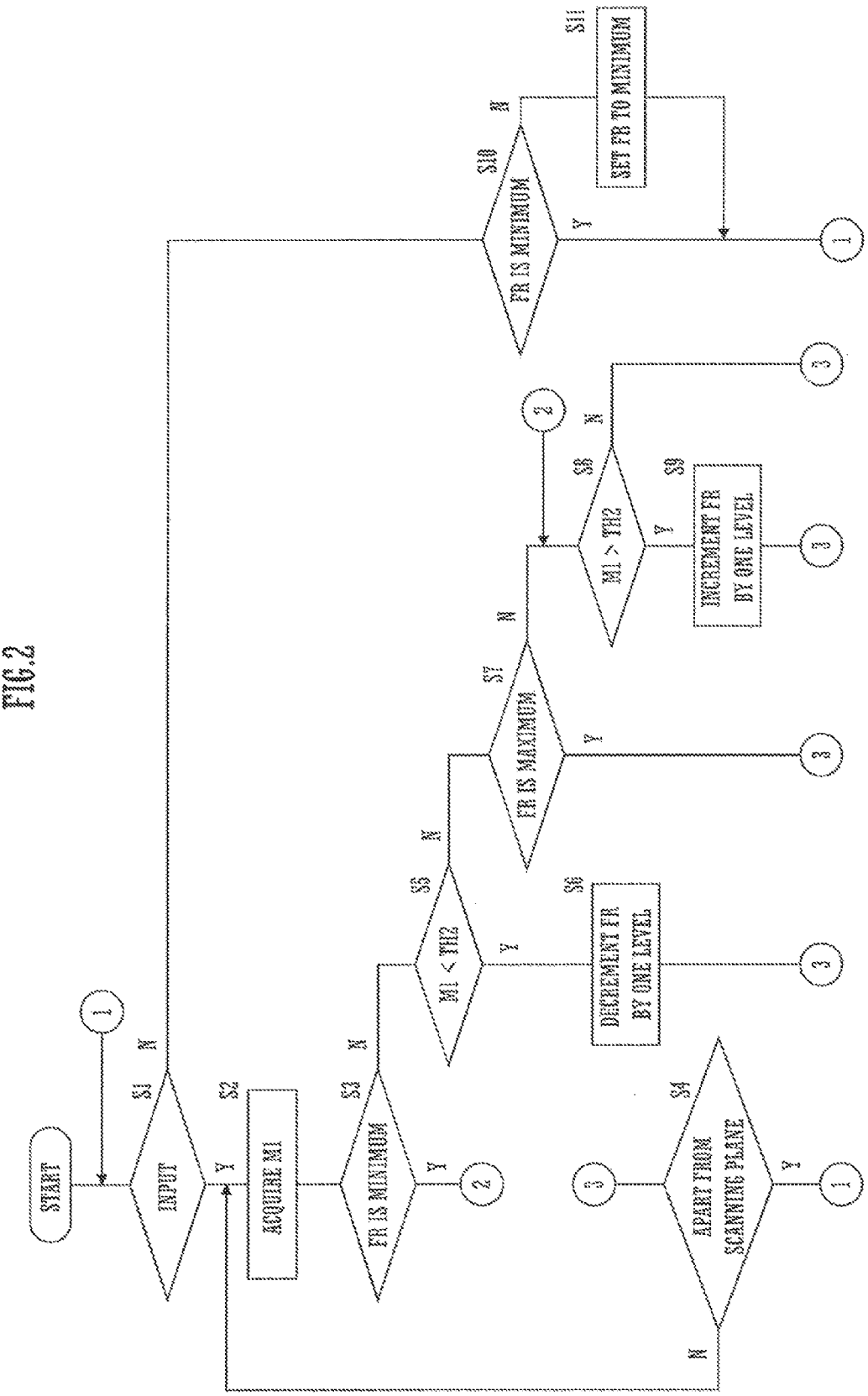
FIG. 2 is a flowchart showing an example processing procedure of a control portion.

With reference to FIG. 2, the control portion 14 determines, depending on whether the capacitance detected by the capacitive sensor 11 is changed or not, whether the input operation by the user i.e., the touch operation on the scanning plane occurs or not (S1). If the touch operation occurs, then the control portion 14 acquires the amount of movement M1 of the touch position between frames (S2).

Here, the first threshold TH1 and the second threshold TH2 to be compared with the amount of movement M1 between frames are described. By way of example, the first threshold TH1 and the second threshold TH2 are set as follows, assuming that the maximum amount of movement of the touch position in a second is 3 m. Note that FR(0) represents the present frame rate, FR(−1) represents a frame rate down one level, and FR(+1) represents a frame rate up one level.

$$TH1 = (3000 \text{ (mm)}/FR(0)) \times (FR(-1)/FR(0))$$

$$TH2 = (3000 \text{ (mm)}/FR(0)) \times (FR(0)/FR(+1))$$

3000 (mm)/FR(0) represents the maximum amount of movement during one frame and is 60 mm for the present frame rate FR(0) of 50 Hz, 15 mm for 200 Hz, and 7.5 mm for 400 Hz.

The first threshold TH1 and the second threshold TH2 are set relative to the maximum amount of movement during one frame. If the interval of the detected touch positions is smaller than the first threshold TH1, the frame rate FR may be reduced without making the roughness of the drawn lines recognized. In addition, if the interval of the detected touch positions is larger than the second threshold TH2, the roughness of the drawn line may become recognized or the drawn points between the touch positions may be incompletely complemented, thus drawing discontinuous lines.

Figure 3B:
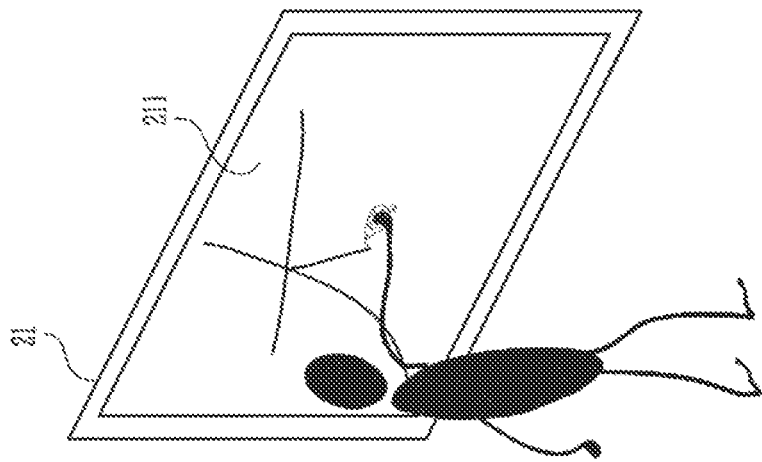
FIG. 3B shows an example condition in which a user moves the touch position at a high speed relative to the scanning plane.
Figure 3A:
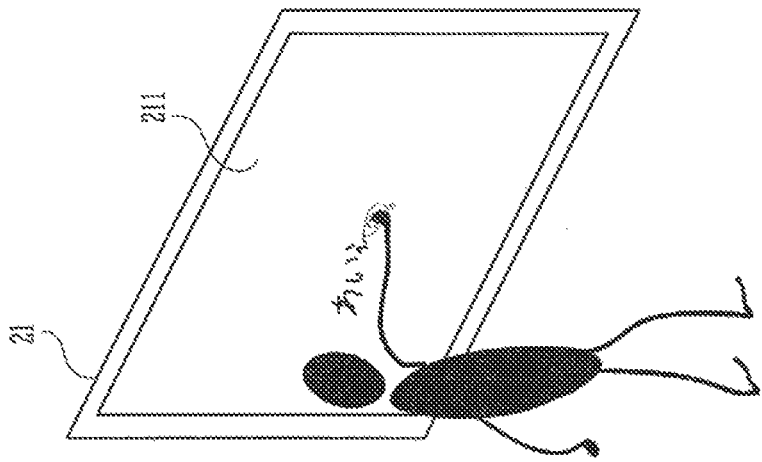
FIG. 3A shows an example condition in which a user moves a touch position at a low speed relative to a scanning plane.

For example, with referee to FIG. 3A, when characters are written in a small region in the scanning plane 211 of the display portion 21, the touch position is often moved at a relatively low speed and it is thus considered that the amount of movement M1 of the touch position between frames is smaller than the first threshold TH1. Meanwhile, with reference to FIG. 3B, when characters are written in a large region in the scanning plane 211, the touch position is often moved at a relatively high speed and it is thus considered that the amount of movement M1 of the touch position between frames is larger than the second threshold TH2.

As shown in an example in FIG. 4, the frame rate FR is selected and set from a plurality of predetermined set values. In this embodiment, 50 Hz is predetermined as the minimum first set value, 200 Hz is predetermined as the second set value, and 400 Hz is predetermined as the maximum third set value. The first set value, the second set value, and the third set value are the frame rate candidates. The frame rate FR may be selected and set from a plurality of predetermined set values to facilitate the change processing of the frame rate FR.

In this embodiment, when the present frame rate FR(0) is the second set value (200 Hz), the first threshold TH1 is set to 3.75 mm as represented by the following expression.

$$TH1=(3000/200) \times (50/200)=15/4=3.75 \text{ (mm)}$$

When the present frame rate FR(0) is the second set value (200 Hz), the second threshold TH2 is set to 7.5 mm as represented by the following expression.

$$TH2=(3000/200) \times (200/400)=15/2=7.5 \text{ (mm)}$$

When the present frame rate FR(0) is the first set value (50 Hz), the second threshold TH2 is set to 15 mm as represented by the following expression.

$$TH2=(3000/50) \times (50/200)=15 \text{ (mm)}$$

When the present frame rate FR(0) is the third set value (400 Hz), the first threshold TH1 is set to 3.75 mm as represented by the following expression.

$$TH1=(3000/400) \times (200/400)=3.75 \text{ (mm)}$$

The control portion 14 acquires the current set value of the frame rate FR.

The control portion 14 determines whether the current set value of the frame rate FR is the minimum or not (S3).

If the frame rate FR is the minimum, then the control portion 14 determines whether the amount of movement M1 of the touch position between frames is larger than the second threshold TH2 or not (S8).

If the frame rate FR is the minimum and the amount of movement M1 between frames is larger than the second threshold TH2, then the control portion 14 increments the frame rate FR by one level (S9) to the second set value. For a large amount of movement M1 between frames, the frame rate FR may be set to a higher speed to reduce the position interval of the detected touch positions between successive frames, thus allowing for improved scanning accuracy.

The control portion 14 determines whether the object is apart from the scanning plane or not (S4). If the object is not apart, then control returns to the processing of S2, and if the object is apart, then control returns to the processing of S1.

If the control portion 14 determines, at S8, that the amount of movement M1 between frames is not larger than the second threshold TH2, then control proceeds to the processing of S4 without changing the frame rate FR.

If the control portion 14 determines, at S3, that the frame rate FR is not the minimum, then it determines whether the amount of movement M1 of the touch position between frames is smaller than the first threshold TH1 or not (S5).

If the frame rate FR is not the minimum and the amount of movement M1 of the touch position between frames is smaller than the first threshold TH1, then the control portion 14 decrements the frame rate FR by one level (S6) and proceeds to the processing of S4. For a small amount of movement M1 between frames, the frame rate FR may be reduced without largely increasing the position interval of the defected touch positions between successive frames, thus allowing a fine scanning. In addition, the frame rate FR may be set to a low speed to reduce the processing load of the position detection.

For example, if the amount of movement M1 of the touch position between frames is less than the first threshold TH1 (3.75 mm) when the frame rate FR is the second set value (200 Hz), the amount of movement M1 between frames is less than 15 mm even if the frame rate FR is set at 200÷4=50 (Hz). It is thus considered that the roughness of the drawn lines is unrecognized. Therefore, the control portion 14 decrements the frame rate FR by one level to the minimum first set value (50 Hz).

If the frame rate FR is not the minimum and the amount of movement M1 of the touch position between frames is larger than the first threshold TH1, then the control portion 14 determines whether the set frame rate FR is the maximum or not (S7).

If the set frame rate FR is the maximum, then the control portion 14 proceeds to the processing of S4 without changing the frame rate FR.

If the set frame rate FR is not the maximum, then the control portion 14 determines whether the amount of movement M1 of the touch position between frames is larger than the second threshold TH2 or not (S8).

If the set frame rate FR is not the maximum and the amount of movement M1 between frames is larger than the second threshold TH2, then the control portion 14 increments the frame rate FR by one level (S9) and proceeds to the processing of S4. If the frame rate FR is the first set value, then it is incremented to the second set value. If the frame rate FR is the second set value, then it is incremented to the third set value. For a large amount of movement M1 between frames, the frame rate FR may be set to a higher speed to reduce the position interval of the detected touch positions between successive frames, thus allowing for improved scanning accuracy.

If the amount of movement M1 between frames is not smaller than the first threshold (NO in S5) and not larger than the second threshold (NO in S8), then the control portion 14 proceeds to the processing of S4 without changing the frame rate FR.

When the control portion 14 is waiting for the touch operation by the user, i.e., when the touch position is not detected, the control portion 14 determines whether the set frame rate FR is the minimum or not (S10). If the set frame rate FR is the minimum, then control returns to the processing of S1. If the set frame rate FR is not the minimum, then the frame rate FR is set to the minimum (S11) and control returns to the processing of S1. Thus, the processing load when waiting for the touch operation by the user may be reduced.

In this way, according to the display input device 1, for a larger amount of movement M1 of the touch position between frames, the frame rate FR is set to a higher speed, thus reducing the position interval of the detected touch position. Meanwhile, for a smaller amount of movement M1 of the touch position between frames, the frame rate FR is set to a lower speed, thus allowing for reduced processing load of the position detection while maintaining the high scanning accuracy. Therefore, the processing load of the position detection may be reduced for power saving and improved scanning accuracy.

Figure 5A:
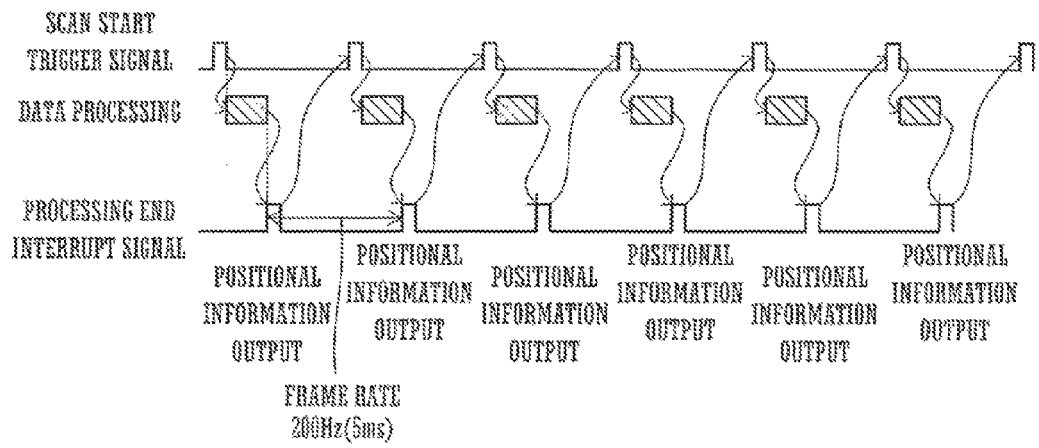
FIG. 5A is a timing chart schematically showing processing of the coordinate position detecting device.
Figure 5B:
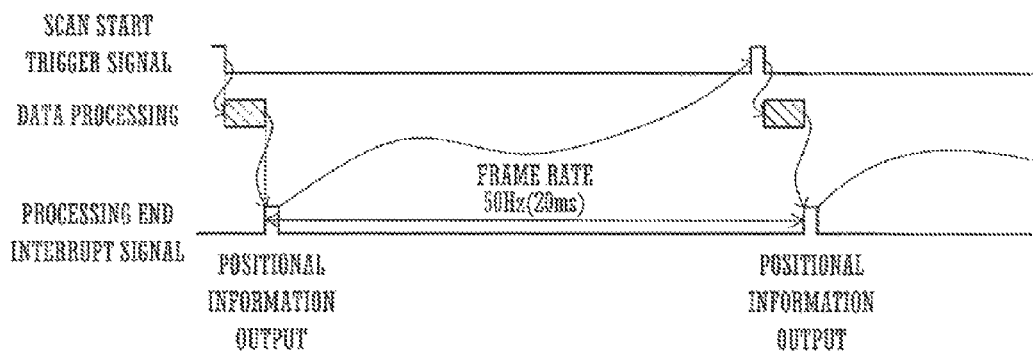
FIG. 5B is a timing chart schematically showing processing of the coordinate position detecting device.
Figure 5C:
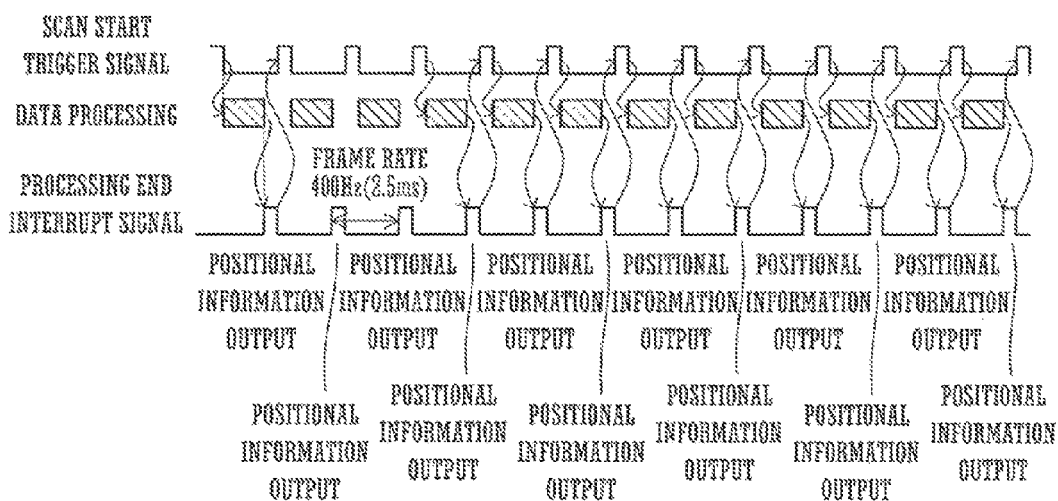
FIG. 5C is a timing chart schematically showing processing of the coordinate position detecting device.

FIG. 5A to 5C are timing charts schematically showing the processing for the frame rate FR of 200 Hz (the second set value), 50 Hz (the first set value), and 400 Hz (the third set value).

With reference to FIG. 5A, when the frame rate FR is 200 Hz, the scan start trigger signal is output from the sensor driving portion 12 of a time interval of 1/200 seconds i.e., five milliseconds (5 ms). When the scan start trigger signal is output, the capacitive sensor 11 scans for detecting a touch position, and the touch recognition processing portion 13 performs data processing for the capacitance detected by the capacitive sensor 11. The data processing detects whether the touch operation occurs or not. If the touch operation occurs, then the data processing detects the positional information of the touch position. When the data processing is ended, the touch recognition processing portion 13 outputs positional information to the control portion 14 via a processing end interrupt signal. Thus, the positional information of the touch position is output two hundred times in a second at an interval of five milliseconds.

With reference to FIG. 5B, when the frame rate FR is 50 Hz, the scan start trigger signal is output at a time interval of 1/50 seconds i.e., 20 milliseconds (20 ms). More specifically, the cycle of the scan start trigger signal and the processing end interrupt signal is increased by a factor of four compared to that in FIG. 5A in which the frame rate FR is 200 Hz. Therefore, the throughput in the touch screen 10 may be decreased by a factor of four, thus allowing for less power consumption of the touch screen 10.

With reference to FIG. 5C, when one frame rate FR in 400 Hz, the scan start trigger signal is output at an interval of 1/400 seconds, i.e., 2.5 millisecond (2.5 ms). More specifically, the cycle of the scan start trigger signal and the processing end interrupt signal is decreased by a factor of two, compared to that in FIG. 5A in which the frame rate FR is 200 Hz. Thus, the scanning accuracy may be improved. In addition, although in this case the power consumption is temporarily increased, reduction of the moving speed of the touch operation by the user quickly decreases the frame rate FR, thus allowing for the improved scanning accuracy as well as the minimum necessary increase of the power consumption.

In this way, when the touch position is not detected, power saving may be achieved by setting the frame rate FR to the minimum, and also when the touch position is detected, power saving may be achieved by changing the frame rate FR depending on the amount of frame-to-frame movement of the touch position detected for each frame.

Although, in the above embodiments, the description assumes that the clock frequency for the internal processing is constant, in the data processing time when the frame rate FR is 200 Hz as shown in FIG. 5A, the time interval between the scan start trigger signals is about twice that in the data processing time when the frame rate FR is 400 Hz as shown in FIG. 5C, and therefore, the clock frequency for the internal processing may be reduced by half for power saving, as shown in FIG. 6.

Note that the set value of the frame rate FR is not limited to three levels, but it may be set to two levels or four or more levels.

In addition, it is preferable that the first threshold TH1 and the second threshold TH2 may be set to values depending on the resolution of the scanning plane 211 of the display portion 21. More specifically, for a higher resolution of the scanning plane 211, smaller values may be set to the first threshold TH1 and the second threshold TH2, thus allowing for improved scanning accuracy depending on the resolution of the scanning plane 211. Meanwhile, for a lower resolution of the scanning plane 211, larger values may be set to the first threshold TH1 and the second threshold TH2, thus allowing for reduced processing load of the position detection for power saving.

In addition, the coordinate position detecting device is not limited to the projected capacitive touch screen. The present invention is also applicable to any device, such as an optical touch screen or a pointing device, that detects a touch position coordinate in a scanning plane for each frame of the scanning plane.

Additionally, the present invention is not limited to the application to the display input device 1 including the display device 20. The present invention may also be applied to a coordinate position input device not including the display device 20 and thus reduce the processing load of the position detection for power saving and improved scanning accuracy.

A combination of each technical feature in the above embodiments may produce new embodiments.

The described embodiments are to be considered in all respects as illustrative and not restrictive. It should be appreciated that the scope of the invention is not limited to the described embodiments and is defined by the appended claims. All changes that come within the meaning and range of the appended claims and any equivalents thereof are intended to be embraced within the scope of the invention.

What is claimed is:

1. A coordinate position detecting device comprising:
a position detecting portion detecting a touch position coordinate in a scanning plane for each frame of the scanning plane;
a driving portion driving the position detecting portion at a frame rate, the frame rate representing the number of frames detected by the position detecting portion per unit time, the frame rate being variable in correlation with position interval values for a position interval between touch position coordinates in successive frames; and
a control portion acquiring the position interval of a touch position between successive frames by the touch position coordinates detected by the position detecting portion, and setting the frame rate corresponding to the acquired position interval of the touch position in accordance with the correlation between the frame rate and the position interval values.

2. The coordinate position detecting device according to claim 1, wherein
position interval values is such that the control portion sets the frame rate to a higher frame rate for the acquired position interval of the touch position that is larger than a second threshold.

3. The coordinate position detecting device according to claim 1, wherein
the control portion selects a frame rate to be set for the driving portion from a plurality of predetermined frame rate candidates.

4. The coordinate position detecting device according to claim 2, wherein
the control portion selects a frame rate to be set for the driving portion from a plurality of predetermined frame rate candidates.

5. The coordinate position detecting device according to claim 3, wherein the control portion sets a lowest frame rate when the touch position is not detected.

6. A display input device comprising:
a display device displaying information on a display screen; and the coordinate position detecting device according to claim 1, the coordinate position detecting device being overlapped on the display screen, and the coordinate position detecting device being configured to be able to receive an input operation corresponding to the information displayed on the display screen.

7. The coordinate position detecting device according to claim 1, wherein the correlation between the frame rate and the position interval values is such that the control portion sets the frame rate to a lower frame rate for the acquired position interval of the touch position that is lower than a first threshold.

8. The coordinate position detecting device according to claim 2, wherein the correlation between the frame rate and the position interval values is such that the control portion sets the frame rate to a lower frame rate for the acquired position interval of the touch position that is lower than a first threshold.

* * * * *